Figure 1:
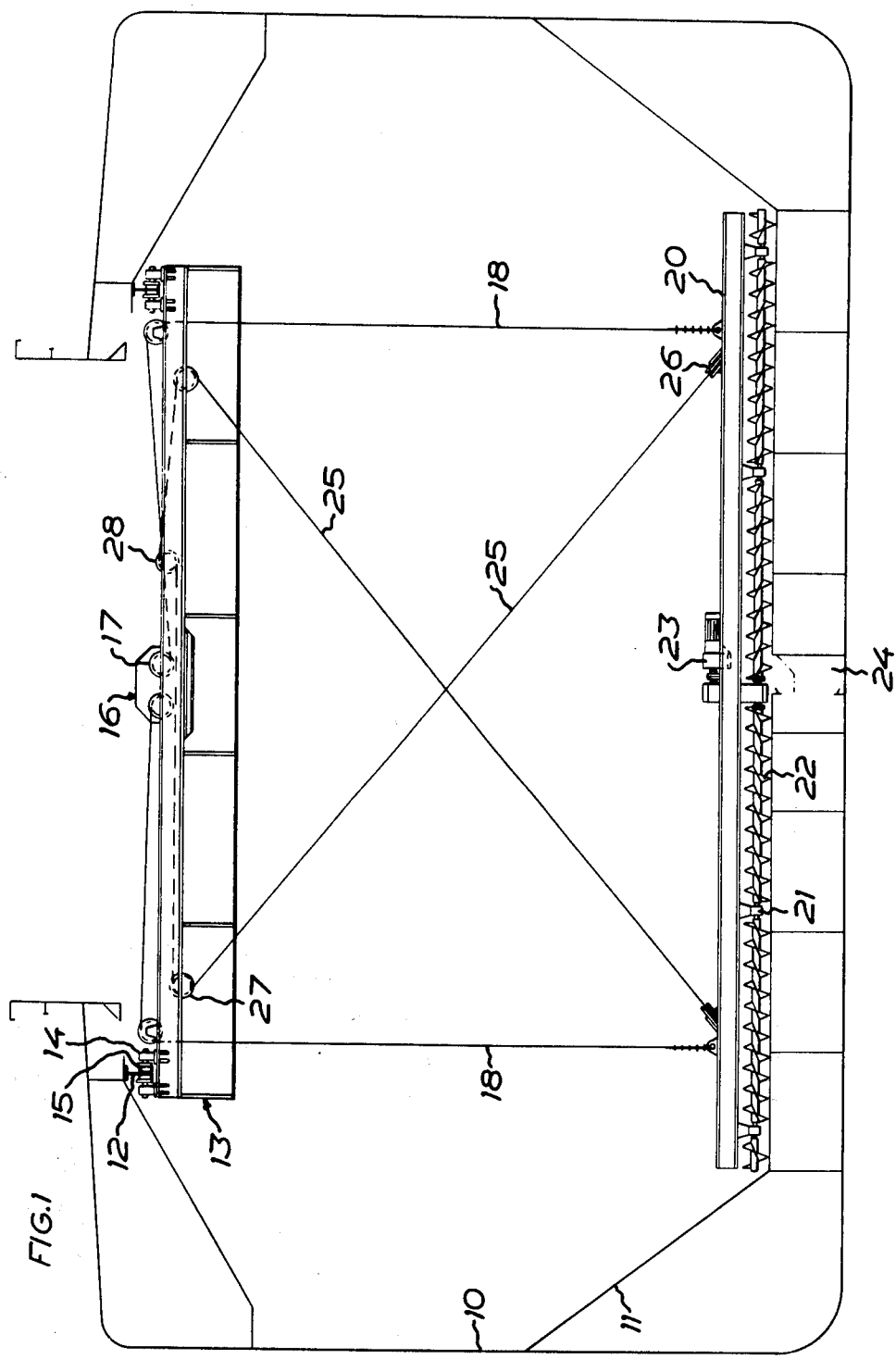

United States Patent [19]

Johansson

[11] 4,146,144
[45] Mar. 27, 1979

[54] APPARATUS FOR DISCHARGING LOOSE PARTICULATE SOLID MATERIAL FROM A STORAGE SPACE

[75] Inventor: Olof Å. A. Johansson, Hässleholm, Sweden

[73] Assignee: Ingenjorsfirman Nils Weibull AB, Hässleholm, Sweden

[21] Appl. No.: 789,635

[22] Filed: Apr. 21, 1977

[30] Foreign Application Priority Data

Jul. 23, 1976 [SE] Sweden ............................. 7608396

[51] Int. Cl.² ............................................. B63B 27/20
[52] U.S. Cl. ................................... 414/133; 212/3 R; 414/144; 414/313
[58] Field of Search ......... 214/10, 15 D, 658, 17 DB; 198/558, 616, 669; 212/11, 14, 124, 125, 126, 127, 3

[56] References Cited

U.S. PATENT DOCUMENTS

| | | | |
|---|---|---|---|
| 3,129,828 | 4/1964 | Lusk | 214/17 DB |
| 3,476,263 | 11/1969 | Komatsu | 212/14 |
| 3,672,518 | 6/1972 | Andersson | 214/17 DB |

FOREIGN PATENT DOCUMENTS

485957  5/1938  United Kingdom ............... 214/17 DB

Primary Examiner—Francis S. Husar
Assistant Examiner—George F. Abraham
Attorney, Agent, or Firm—Weingarten, Maxham & Schurgin

[57] ABSTRACT

An apparatus for discharging loose particulate solid material from a storage space, for instance the hold of a ship. A screw conveyor is suspended in a carriage mounted at the upper part of the space and is horizontally movable. The carriage has a hoisting machinery for wire ropes in which a beam is suspended along which the conveyor is mounted. At least two stabilizing wire ropes are secured to the beam and run to pulleys on the carriage, which pulleys are so disposed that the wire ropes cross each other at a point between the carriage and the beam. From the pulleys stabilizing wire ropes run to a device for keeping the wire ropes tensioned when the beam is raised, lowered and stationary.

3 Claims, 2 Drawing Figures

APPARATUS FOR DISCHARGING LOOSE PARTICULATE SOLID MATERIAL FROM A STORAGE SPACE

This invention relates to an apparatus for discharging loose particulate solid material from a storage space, such as a silo, the hold of a ship etc., comprising a scraper or screw conveyor, a carriage mounted at the upper part of the building and being rotatable or horizontally movable, said carriage having a hoisting machinery for wire ropes in which a beam is suspended along which the conveyor is mounted.

In storage premises and particularly in certain silos and ships' holds the walls often have such a configuration that the type of discharging apparatus described in the inroduction cannot be utilized because it must be dimensioned for the narrowest part of the premises or hold and, as a consequence, in the widest part has sufficient space to move in its longitudinal direction, which may happen in the operation of the conveyor and which involves considerable problems. Various attempts have been made to stabilize the beam supporting the conveyor but without success primarily because the stabilizing measures have involved extremely complicated solutions which have unfavourably affected the discharge process.

The object of the present invention is to solve the above problems in a simple and inexpensive manner.

To this end, the invention provides an apparatus of the type described, wherein at least two stabilizing wire ropes are secured to the beam each adjacent one end of said beam, each of said wire ropes running to a pulley on the carriage, said pulleys being so disposed that the wire ropes cross each other at a point between the beam and the carriage, and the wire ropes from the pulleys run to a device for keeping the ropes under tension when the beam is raised, lowered and stationary.

Figure 2:
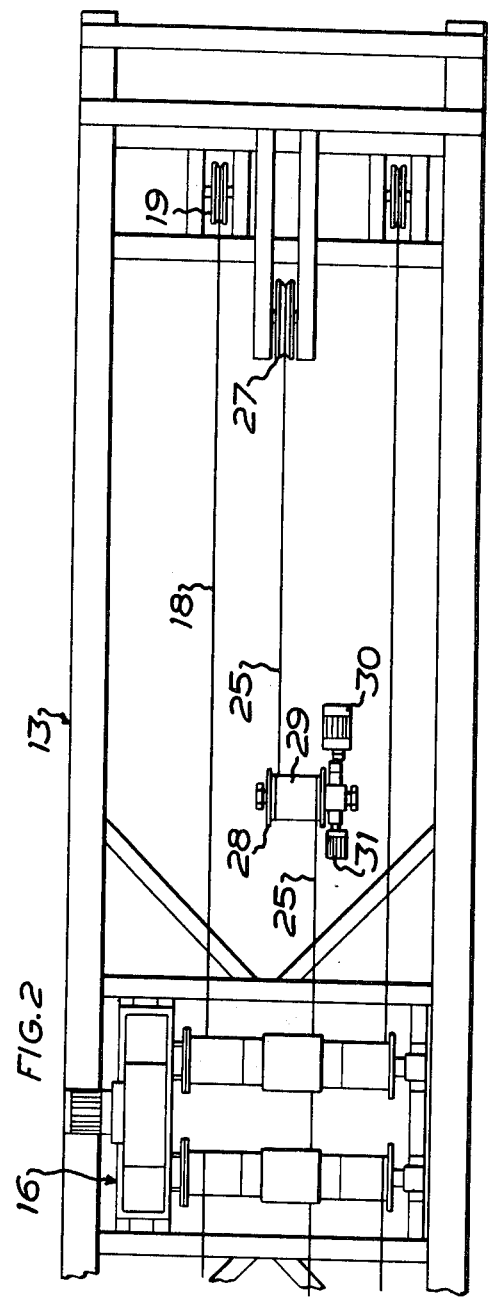

An embodiment of the invention will be described more in detail hereinbelow with reference to the accompanying drawings in which FIG. 1 is an elevational view of an apparatus according to the invention mounted in a storage space; and FIG. 2 is a top plan view of part of the apparatus illustrated in FIG. 1.

In the drawing there is shown a storage space or container 10, in the present instance a ship's hold, which at the bottom has slanting walls 11. At the upper part of the space, rails 12 are mounted for supporting a carriage 13 in the form of a beam by means of rollers 15 mounted at opposite ends of the carriage in bearings 14. The carriage 13 can be moved horizontally with the aid of the rails 12 and the rollers 15 or, in event that the space 10 is round, rotated about its own axis. A hoisting machinery 16 with wire rope drums 17 is arranged on the carriage, and wire ropes 18 can be wound onto and unwound from the drums 17. The wire ropes 18 extend from the hoisting machinery 16 to pulleys 19 adjacent the ends of the carriage 13 and thence vertically downward and are connected at their opposite ends to a beam 20 which at its under side has a conveyor mounted in bearings 21 and consisting of screws 22 which on opposite sides of the mid-point of the beam 20 are of opposite lead so that when the screws are rotated by a drive motor 23 secured to the beam 20, material stored in the space 10 can be conveyed from the region at the ends of the beam towards its middle in order to be discharged through an outlet chute 24 or, in case outlet chutes are provided at the sides of space 10, from the middle towards the beam ends.

If, during the discharge process of the conveyor, the screw on one side of the midpoint of the beam 20 engages throughout its length the material to be discharged while the screw on the other side of the midpoint of the beam engages over but part of its length such material to be discharged, the beam 20 will be actuated by a force component and be moved in one direction, which is disadvantageous. To prevent this, stabilizing wire ropes 25 are connected to the beam 20 at points 26 adjacent the ends of the beam. These wire ropes 25 each run to one pulley 27 on the carriage, these pulleys being so disposed that the wire ropes 25 will cross each other in the space between the carriage 13 and the beam 20, as will appear from FIG. 1. The wire ropes 25 run from the pulleys 20 to a device 28 which serves to keep the wire ropes tensioned under any circumstances, i.e. when the beam 20 is stationary as well as when it moves upwardly or downwardly. The device 28 consists of a rope drum 29 on which, as indicated in FIG. 1, the wire ropes 25 are wound from opposite directions. The rope drum 29 is driven by a special motor 30 which develops full effect, that is, it maintains a constant tension on wire ropes 25, irrespectively of whether it rotates in one or the other direction or is at a standstill. The device 28 also has a brake 31 which is coupled to the rope drum 29 to brake it when the beam 20 is at a standstill and the conveyor is in operation. By the provision of the brake, a motor of lower intermittency factor can be utilized and the retaining force is considerably increased when the screw conveyor is in operation.

It will be directly seen from FIG. 1 that movement of the beam 20 in a longitudinal direction is no longer possible because of the wire ropes 25 which are constantly tensioned by the device 28. Thus, the disadvantageous travel of the beam 20 can be prevented according to the present invention, in an extremely simple, inexpensive and reliable manner.

What I claim and desire to secure by Letters Patent is:

1. Apparatus for discharging loose particulate solid material from a storage container having spaced side walls, said apparatus comprising:
   a carriage;
   means for mounting said carriage adjacent the top of said storage container so that said carriage is horizontally movable;
   an elongated beam positioned below said carriage;
   a screw conveyor mounted to said beam, said conveyor having a length substantially less than the distance between said side walls;
   flexible means for suspending said beam from said carriage;
   means on said carriage connected to said flexible suspending means for providing vertical movement of said beam;
   at least two flexible stabilizing ropes connected to respective ends of said beam and extending to said carriage in such a manner that said stabilizing ropes cross each other between said beam and said carriage; and
   means on said carriage connected to said stabilizing ropes for maintaining a constant predetermined tension thereon regardless of whether said beam is stationary or is being raised or lowered, said tensioning means being separate and independent from said vertical movement providing means.

2. The apparatus recited in claim 1 wherein said tensioning means comprises:

a rope drum on which said stabilizing ropes are wound from opposite directions; and a motor of the type that develops full effect when at a standstill and when rotating in either direction.

3. The apparatus recited in claim 2 wherein said tensioning means further comprises a brake coupled to said rope drum, said brake being operable when said beam is stationary and said screw conveyor is in operation.

* * * * *